(12) United States Patent
Fang et al.

(10) Patent No.: US 12,189,797 B2
(45) Date of Patent: Jan. 7, 2025

(54) FILE ACCESS RIGHT AUTHENTICATION METHOD AND ELECTRONIC DEVICE

(71) Applicant: HUAWEI TECHNOLOGIES CO., LTD., Shenzhen (CN)

(72) Inventors: Xiwen Fang, Shanghai (CN); Qiang Wei, Shenzhen (CN); Wenyuan Tian, Beijing (CN); Anyu Wang, Shenzhen (CN); Zhe Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 487 days.

(21) Appl. No.: 17/439,467

(22) PCT Filed: Mar. 13, 2020

(86) PCT No.: PCT/CN2020/079104
§ 371 (c)(1),
(2) Date: Sep. 15, 2021

(87) PCT Pub. No.: WO2020/192447
PCT Pub. Date: Oct. 1, 2020

(65) Prior Publication Data
US 2022/0156391 A1 May 19, 2022

(30) Foreign Application Priority Data
Mar. 22, 2019 (CN) .......................... 201910220920.3

(51) Int. Cl.
*G06F 21/60* (2013.01)
*G06F 21/62* (2013.01)

(52) U.S. Cl.
CPC .......... *G06F 21/606* (2013.01); *G06F 21/602* (2013.01); *G06F 21/6209* (2013.01);
(Continued)

(58) Field of Classification Search
None
See application file for complete search history.

(56) References Cited

U.S. PATENT DOCUMENTS 5,870,477 A * 2/1999 Sasaki ................... G06F 21/606
713/165
8,127,316 B1 * 2/2012 Binotto ................... G06F 21/54
719/331

(Continued)

FOREIGN PATENT DOCUMENTS

CN 101719210 A 6/2010
CN 104123506 A 10/2014
(Continued)

*Primary Examiner* — Eleni A Shiferaw
(74) *Attorney, Agent, or Firm* — Rimon PC

(57) ABSTRACT

A file access right authentication method and system allows right authentication to be performed on an access request for accessing a file in a system to thereby improve system security. The method includes: receiving, by an electronic device, a file access request, where the file access request is used to request to access a first file on the electronic device; obtaining a first process identifier in the file access request, and determining first fixed identity information corresponding to the first process identifier; and matching the first fixed identity information with authorized fixed identity information corresponding to the first file), and when the matching succeeds, determining that authentication of the file access request is successful.

12 Claims, 12 Drawing Sheets

(52) U.S. Cl.
CPC ...... *G06F 21/6218* (2013.01); *G06F 21/6227* (2013.01); *G06F 21/6281* (2013.01); *G06F 2221/2141* (2013.01)

(56) References Cited

U.S. PATENT DOCUMENTS

| | | | |
|---|---|---|---|
| 9,769,247 B2* | 9/2017 | Rong | H04L 67/34 |
| 2003/0142826 A1* | 7/2003 | Asano | H04L 9/0836 |
| | | | 380/277 |
| 2004/0010701 A1* | 1/2004 | Umebayashi | G06F 21/6227 |
| | | | 713/193 |
| 2005/0138320 A1* | 6/2005 | Mitarai | G06F 12/08 |
| | | | 711/170 |
| 2007/0143632 A1* | 6/2007 | Matsuzaki | G06F 21/6218 |
| | | | 713/193 |
| 2008/0235517 A1* | 9/2008 | Ohmori | H04L 9/0891 |
| | | | 713/187 |
| 2013/0062401 A1 | 3/2013 | Sheehan et al. | |
| 2013/0246806 A1* | 9/2013 | Usuba | G06F 21/6209 |
| | | | 726/30 |
| 2015/0363189 A1* | 12/2015 | Nakamura | H04L 43/08 |
| | | | 717/169 |
| 2016/0196442 A1* | 7/2016 | Chapman, III | G06F 21/6218 |
| | | | 726/29 |
| 2016/0219024 A1* | 7/2016 | Verzun | H04L 9/34 |
| 2017/0093844 A1* | 3/2017 | Chambliss | G06F 21/10 |
| 2018/0102902 A1* | 4/2018 | Yang | H04L 9/3226 |
| 2019/0149525 A1* | 5/2019 | Gunda | H04L 63/0428 |
| | | | 713/171 |

FOREIGN PATENT DOCUMENTS

| | | | | | |
|---|---|---|---|---|---|
| CN | 104281814 | A | | 1/2015 | |
| CN | 104869569 | A | | 8/2015 | |
| CN | 108228770 | A | * | 6/2018 | |
| CN | 108985095 | A | | 12/2018 | |
| CN | 110059499 | A | | 7/2019 | |
| EP | 3119159 | A1 | * | 1/2017 | ......... H04L 41/0894 |
| WO | 9819237 | A1 | | 5/1998 | |
| WO | WO-2007120360 | A2 | * | 10/2007 | ........... G06F 16/122 |
| WO | 2016046324 | A1 | | 3/2016 | |
| WO | 2018203913 | A1 | | 11/2018 | |

* cited by examiner

FILE ACCESS RIGHT AUTHENTICATION METHOD AND ELECTRONIC DEVICE

CROSS-REFERENCE TO RELATED APPLICATIONS

This application is a National Stage of International Application No. PCT/CN2020/079104, filed on Mar. 13, 2020, which claims priority to Chinese Patent Application No. 201910220920.7, filed on Mar. 22, 2019. Both of the aforementioned applications are hereby incorporated by reference in their entireties.

TECHNICAL FIELD

This application relates to the field of terminal technologies, and in particular, to a file access right authentication method and electronic device.

BACKGROUND

In recent years, with rapid development of the electronics industry and communications technologies, there are increasingly more intelligent terminal devices, for example, a mobile phone, a smart speaker, and a smart band. Due to portability and the capability of mobile phones to download application software with various functions from an application store, the mobile phone has become a necessity in daily life.

Currently, file access control of a mobile phone depends on a sandbox isolation access mechanism of an operating system. The sandbox isolation access mechanism may ensure that a file of an application A cannot be accessed by an application B, and each application can access only a file of the application. However, when the operating system of the mobile phone is attacked by a Trojan horse program, the Trojan horse program may obtain a highest access right. Therefore, the Trojan horse program may break through the sandbox isolation access mechanism to directly obtain a file of another application, for example, to copy phone book information of a contacts application. Consequently, user privacy is compromised.

SUMMARY

This application provides a file access right authentication method and an electronic device, to increase security of file access control in an operating system of a terminal, and thus improve security of the operating system of the terminal.

According to a first aspect, an embodiment of this application provides a file access right authentication method, where the method is applicable to an electronic device, and the method includes: The electronic device receives a file access request, where the file access request is used to request access to a first file on the electronic device. Next, the electronic device obtains a first process identifier in the file access request, and determines first fixed identity information corresponding to the first process identifier. Subsequently, the electronic device determines whether the first fixed identity information is consistent with authorized fixed identity information corresponding to the first file. When the first fixed identity information is inconsistent with authorized fixed identity information, the electronic device determines that authentication of the file access request fails. When the first fixed identity information is consistent with authorized fixed identity information, the electronic device determines that authentication of the file access request succeeds.

In this embodiment of this application, the electronic device performs access right authentication on a file access request by using fixed identity information of an application on a mobile phone. In the authentication method, whether fixed identity information corresponding to a process identifier in the access request is consistent with authorized fixed identity information corresponding to a to-be-accessed file may be determined. If the fixed identity information corresponding to the process identifier in the access request is consistent with the authorized fixed identity information corresponding to the to-be-accessed file, authentication succeeds, and the file system decrypts the file. Otherwise, authentication fails. In this way, when a malicious application performs file access on a file of another application, a file system performs authentication on the file access request. Because the authentication fails, access of the malicious application is denied. Therefore, a file in the file system is securely accessed, and system security is improved.

In a possible design, when the matching succeeds, the electronic device may further decrypt file-key ciphertext by using the first fixed identity information. When the decryption succeeds, the electronic device determines that the authentication of the file access request succeeds. When the decryption fails, the electronic device determines that the authentication of the file access request fails. The file-key ciphertext is ciphertext of a file key used to encrypt the first file.

In this embodiment of this application, in the foregoing method, the file system may perform right authentication on a file access request. Only when the file access request comes from an application to which a file belongs, matching with fixed identity information can be completed. Even if a malicious application tampers with the fixed identity information, the tampering is detected in a procedure of decrypting file-key ciphertext, and consequently authentication fails. In the method, a current access mechanism of the file system can be effectively improved, and privacy security is effectively protected in combination with a sandbox mechanism. In addition, the file access right authentication procedure does not require participation of a user, and is invisible to the user. Therefore, system security is improved, user operations are also effectively simplified, and user experience is improved.

In a possible design, before the electronic device receives the file access request, the electronic device obtains a process identifier and fixed identity information of a running application program, establishes a correspondence between the process identifier and the fixed identity information, and establishes a correspondence between a newly created file and the fixed identity information.

In this embodiment of this application, an identity management module obtains fixed identity information of an application from a package management service module, and establishes a mapping relationship between the fixed identity information and a file identifier and a correspondence between a process identifier of an application to which the file belongs and the fixed identity information. In this way, when receiving a file access request, the electronic device can compare fixed identity information.

In a possible design, before the electronic device receives the file access request, the electronic device encrypts the file key of the first file based on the fixed identity information corresponding to the first file and a file system primary key according to a preset key encryption algorithm, to generate the file-key ciphertext. The electronic device encrypts the first file by using the file key of the first file, to generate ciphertext of the first file, where a header of the ciphertext of the first file includes the authorized fixed identity information and the file-key ciphertext. Determining that the electronic device matches the first fixed identity information with the authorized fixed identity information corresponding to the first file includes determining that electronic device matches the first fixed identity information with the authorized fixed identity information in the header of the ciphertext of the first file.

In this embodiment of this application, a key encryption/decryption module is configured to encrypt a file key by using fixed identity information, to generate file-key ciphertext. The file-key ciphertext is stored in a header of file ciphertext. After authentication performed by a right authentication module succeeds, the key encryption/decryption module decrypts the file-key ciphertext by using fixed identity information corresponding to a process identifier in a file access request for accessing a file. If the key encryption/decryption module cannot obtain the file key through decryption, the key encryption/decryption module notifies the right authentication module that the authentication fails. Otherwise, the authentication succeeds, and the file key is obtained through decryption. Subsequently, a file encryption/decryption module decrypts the file ciphertext by using the file key, to obtain file plaintext.

According to a second aspect, an embodiment of this application provides a file access right authentication method, where the method is applicable to an electronic device, and the method includes: The electronic device receives a file access request, where the file access request is used to request to access a first file on the electronic device. Next, the electronic device obtains a first process identifier in the file access request, and determines first fixed identity information corresponding to the first process identifier. Subsequently, the electronic device decrypts file-key ciphertext by using the first fixed identity information. When the decryption succeeds, the electronic device determines that authentication of the file access request succeeds. When the decryption fails, the electronic device determines that the authentication of the file access request fails. The file-key ciphertext is ciphertext of a file key used to encrypt the first file.

In this embodiment of this application, a file system may perform right authentication on a file access request. Even if a malicious application tampers with fixed identity information, the tampering is detected in a procedure of decrypting file-key ciphertext, and consequently authentication fails. In the method, a current access mechanism of the file system can be effectively improved, and privacy security is effectively protected in combination with a sandbox mechanism. In addition, the file access right authentication procedure does not require participation of a user, and is invisible to the user. Therefore, system security is improved, user operations are also effectively simplified, and a user experience is improved.

According to a third aspect, an embodiment of this application provides an electronic device, including a processor and a memory. The memory is configured to store one or more computer programs. When the one or more computer programs stored in the memory are executed by the processor, the electronic device is enabled to implement the method in any possible design of any one of the foregoing aspects.

According to a fourth aspect, an embodiment of this application further provides an apparatus. The apparatus includes modules/units for performing the method in any possible design of any one of the foregoing aspects. These modules/units may be implemented by hardware, or may be implemented by hardware by executing corresponding software.

According to a fifth aspect, an embodiment of this application further provides a computer readable storage medium. The computer readable storage medium includes a computer program, and when the computer program is run on an electronic device, the electronic device is enabled to perform the method in any possible design of any one of the foregoing aspects.

According to a sixth aspect, an embodiment of this application further provides a computer program product. When the computer program product is run on a terminal, the electronic device is enabled to perform the method in any possible design of any one of the foregoing aspects.

These aspects or other aspects of this application are clearer and more comprehensible in descriptions of the following embodiments.

DESCRIPTION OF EMBODIMENTS

Figure 1:
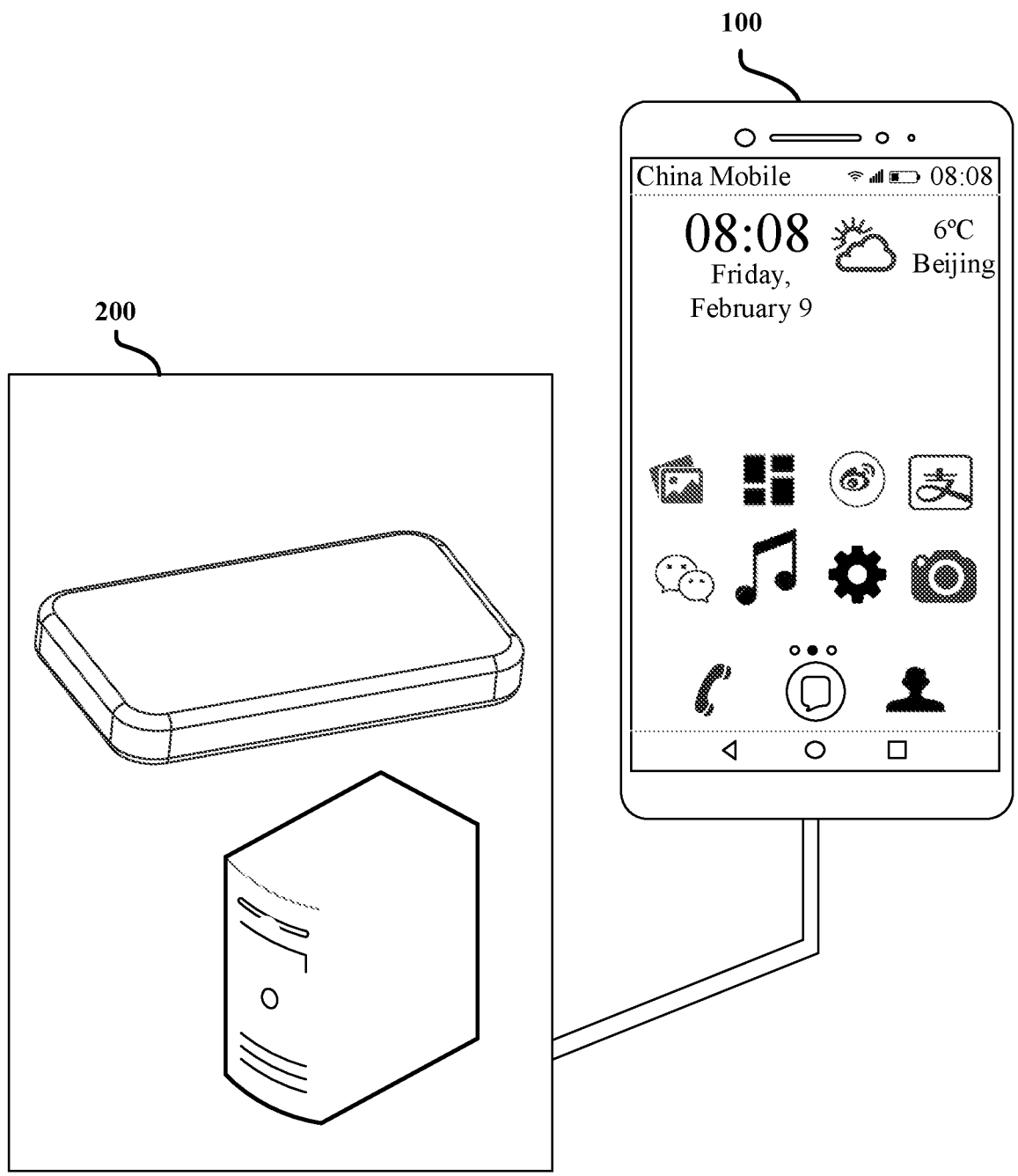
FIG. 1 is a schematic diagram of an interconnection scenario according to an embodiment of this application.

For ease of understanding, descriptions of some concepts related to the embodiments of this application are provided by using an example for reference.

A file system (FS) is a method for storing and organizing computer files and data. There are many types of file systems such as an object-based file system and a log-based file system.

A sandbox mechanism is an isolation running mechanism of a program. In an Android operating system, an application usually runs in an independent sandbox, in other words, each application program runs in a process of the application program, and has an independent virtual machine instance.

Fixed identity information of an application program is a fixed identifier of the application program. The fixed identity information may be a program package name or a signature of the application program, or may be a universally unique identifier (uuid) of the application program. Generally, a parameter that can be used to identify a fixed attribute of the application program may be used as the fixed identity information. For example, a package name of a WeChat application is com.android.weixin, and a signature of the WeChat application is 184afda9653afe.

A file system primary key is used to encrypt a file key or generate a file key, and is stored in a trusted execution environment (TEE). Certainly, the file system primary key alternatively can be stored outside the TEE. This is not limited in this application. Generally, the file system primary key is protected by two factors, a hardware key and a lock screen key, so that a file on a mobile phone cannot be decrypted before a lock screen password is entered after the mobile phone is powered on.

A file key is used to encrypt a file. An encryption algorithm includes 3DES, AES, and the like. An encryption mode includes ECB, CBC, and the like. Another encryption algorithm or another encryption mode may be used. This is not limited herein.

As described in the background, a current sandbox mechanism of the mobile phone still has a security risk. For example, in a scenario shown in FIG. 1, a mobile phone 100 is connected to another electronic device 200 by using a data cable. The another electronic device 200 may be a public mobile power pack or a public computer. The another electronic device 200 may have a malicious application or an unauthorized program. When the mobile phone is connected to the public mobile power pack for charging, or when the mobile phone is connected to a public PC (personal computer) for charging or data transmission, the mobile phone may suffer from an unauthorized attack. It is assumed that the malicious application or the unauthorized program on the public mobile power pack or the public PC attacks the mobile phone to obtain a highest access right, namely, a root right. In this case, when the malicious application or the unauthorized program sends a file access request to a file system of the mobile phone, the file system determines, through authentication only by using the root right, that the file access request is an authorized request. Consequently, the malicious application or the unauthorized program may obtain a file from the file system, causing privacy to be compromised. For example, the malicious application successfully obtains a picture in a WeChat application of the mobile phone, or the malicious application successfully obtains a phone book in a contacts application.

Therefore, the embodiments of this application provide a file access right authentication method. In the method, access right authentication is performed on a file access request by using fixed identity information of an application on the mobile phone. In the authentication method, whether fixed identity information corresponding to a process identifier in the access request is consistent with authorized fixed identity information corresponding to a to-be-accessed file may be determined. If the fixed identity information corresponding to the process identifier in the access request is consistent with the authorized fixed identity information corresponding to the to-be-accessed file, authentication succeeds, and the file system decrypts the file. Otherwise, authentication fails. In this way, when a malicious application performs file access on a file of another application, the file system performs authentication on the file access request. Because the authentication fails, access of the malicious application is denied. Therefore, a file in the file system is securely accessed, and system security is improved.

The file access right authentication method provided in the embodiments of this application may be applied to an electronic device, for example, a mobile phone, a tablet computer, a desktop computer, a laptop computer, a notebook computer, an ultra-mobile personal computer (UMPC), a handheld computer, a netbook, a personal digital assistant (PDA), a wearable electronic device, and a virtual reality device. This is not limited in the embodiments of this application.

Figure 2:
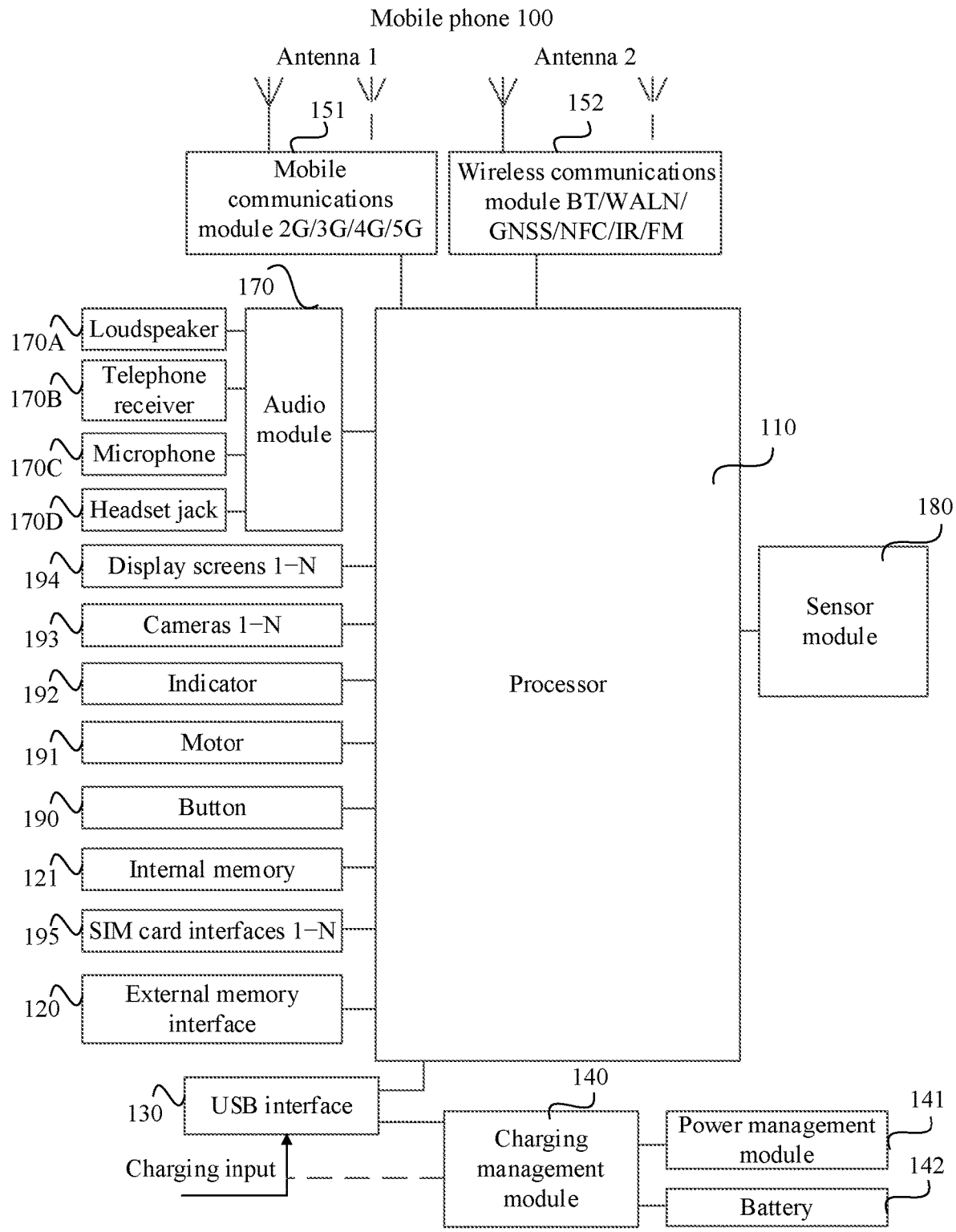
FIG. 2 is a schematic structural diagram of a mobile phone according to an embodiment of this application.

An example in which the electronic device is a mobile phone is used. FIG. 2 is a schematic structural diagram of the mobile phone.

The mobile phone may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a button 190, a motor 191, an indicator 192, a camera 193, a display screen 194, a SIM card interface 195, and the like. The sensor module 180 may include a gyroscope sensor, an acceleration sensor, an optical proximity sensor, a fingerprint sensor, and the like (not shown in the figure).

It may be understood that the schematic structure in the embodiments of the present invention constitutes no specific limitation on the mobile phone 100. In some other embodiments of this application, the mobile phone 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the mobile phone 100. The controller may generate an operation control signal based on instruction operation code and a timing signal, to complete control of instruction reading and instruction execution.

A memory may be further disposed in the processor 110, to store instructions and data. In some embodiments, the memory in the processor 110 is a cache. The memory may store instructions or data that is just used or cyclically used by the processor 110. If the processor 110 needs to use the instructions or the data again, the processor 110 may directly invoke the instructions or the data from the memory, to avoid repeated access, and reduce a waiting time of the processor 110. This improves system efficiency.

The processor 110 may run the file access right authentication method provided in the embodiments of this application. In the method, whether fixed identity information corresponding to a process identifier in an access request is consistent with fixed identity information corresponding to a to-be-accessed file is determined. If the fixed identity information corresponding to the process identifier in the access request is consistent with the fixed identity information corresponding to the to-be-accessed file, authentication succeeds, and a file system decrypts the file. Otherwise, authentication fails. When the processor 110 is integrated with different components, for example, is integrated with a CPU and a GPU, the CPU and the GPU may cooperate with each other to perform the file access right authentication method provided in the embodiments of this application. For example, in the method, some algorithms are executed by the CPU, and some other algorithms are executed by the GPU, to obtain relatively high processing efficiency.

The display screen 194 is configured to display an image, a video, and the like. The display screen 194 includes a display panel. The display panel may use a liquid crystal display (LCD), an organic light-emitting diode (OLED), an active-matrix organic light emitting diode (AMOLED), a flexible light-emitting diode (FLED), a miniLED, a microLED, a micro-OLED, a quantum dot light emitting diode (QLED), and the like. In some embodiments, the mobile phone 100 may include one or N display screens 194, and N is a positive integer greater than 1.

In the embodiments of this application, the display screen may display prompt information for access security of the file system by using a graphical user interface, for example, prompt a user with unauthorized access to current phone book information, to disconnect a data cable.

The camera 193 (a front-facing camera or a rear-facing camera) is configured to capture a still image or a video. Usually, the camera 193 may include a photosensitive element such as a lens group and an image sensor. The lens group includes a plurality of lenses (convex lenses or concave lenses), configured to collect an optical signal reflected by a to-be-photographed object, and transfer the collected optical signal to the image sensor. The image sensor generates an original image of the to-be-photographed object based on the optical signal.

The internal memory 121 may be configured to store computer executable program code, and the executable program code includes instructions. The processor 110 runs the instructions stored in the internal memory 121, to perform various function applications of the mobile phone 100 and data processing. The internal memory 121 may include a program storage area and a data storage area. The program storage area may store an operating system, code of an application program (for example, a camera application or a WeChat application), and the like. The data storage area may store data (for example, an image collected by a camera application, a video, or a phone book) created in a procedure of using the mobile phone 100.

In addition, the internal memory 121 may include a high-speed random access memory, and may further include a non-volatile memory such as at least one magnetic disk storage, a flash memory, or a universal flash storage (universal flash storage, UFS).

For example, a home screen is displayed on the display screen 194 of the mobile phone 100. The home screen includes icons of a plurality of applications (for example, a camera application and a WeChat application). The user taps an icon of the camera application on the home screen by using the touch sensor 180K, to trigger the processor 110 to start the camera application and open the camera 193. The display screen 194 displays an interface of the camera application, for example, a framing interface.

A wireless communication function of the mobile phone 100 may be implemented by using the antenna 1, the antenna 2, the mobile communications module 151, the wireless communications module 152, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may be further multiplexed to improve utilization of the antennas. For example, the antenna 1 may be multiplexed as a diversity antenna of a wireless local area network. In some other embodiments, the antenna may be used in combination with a tuning switch.

The mobile communications module 151 may provide a solution to wireless communication such as 2G/3G/4G/5G applied to the mobile phone 100. The mobile communications module 151 may include at least one filter, a switch, a power amplifier, a low noise amplifier (LNA), and the like. The mobile communications module 151 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules of the mobile communications module 151 may be disposed in the processor 110. In some embodiments, at least some functional modules of the mobile communications module 151 and at least some modules of the processor 110 may be disposed in the same component.

The modem processor may include a modulator and a demodulator. The modulator is configured to modulate a to-be-sent low-frequency baseband signal into an intermediate/high-frequency signal. The demodulator is configured to demodulate a received electromagnetic wave signal into a low-frequency baseband signal. Subsequently, the demodulator transmits the low-frequency baseband signal obtained through demodulation to the baseband processor for processing. After the low-frequency baseband signal is processed by the baseband processor, the low-frequency baseband signal is transmitted to the application processor. The application processor outputs a sound signal by using an audio device (which is not limited to the loudspeaker 170A, the telephone receiver 170B, and the like), or displays an image or a video by using the display screen 194. In some embodiments, the modem processor may be an independent component. In some other embodiments, the modem processor may be independent of the processor 110, and is disposed in a same component as the mobile communications module 150 or another functional module.

The wireless communications module 152 may provide a mechanism for wireless communication applied to the mobile phone 100, for example, a wireless local area network (wireless local area networks, WLAN) (for example, a wireless fidelity (Wi-Fi) network, BLUETOOTH™ (BT), a global navigation satellite system (GNSS), frequency modulation (FM), near field communication (NFC), and an infrared (IR) technology. The wireless communications module 152 may be one or more components into which at least one communication processing module is 5 integrated. The wireless communications module 152 receives an electromagnetic wave by using the antenna 2, performs frequency modulation and filtering processing on an electromagnetic wave signal, and sends a processed signal to the processor 110. The wireless communications module 152 may further receive a to-be-sent signal from the processor 110, perform frequency modulation and amplification on the signal, and convert the signal into an electromagnetic wave for radiation 10 by using the antenna 2.

In addition, the mobile phone 100 may implement an audio function such as music playing or recording by using the audio module 170, the loudspeaker 170A, the telephone receiver 170B, the microphone 170C, the headset jack 170D, the application processor, and the like. The mobile phone 100 may receive an input performed by using the button 190, and generate a key signal input related to user setting and function control of the mobile phone 100. The mobile phone 100 may generate a vibration prompt (for example, an incoming call vibration prompt) by using the motor 191. The indicator 192 in the mobile phone 100 may be an indicator light, may be configured to indicate a charging state and a battery change, and may also be configured to indicate a message, a missed call, a notification, and the like. The SIM card interface 195 in the mobile phone 100 is configured to connect a SIM card. The SIM card may be inserted into the SIM card interface 195 or removed from the SIM card interface 195, to implement contact with and separation from the mobile phone 100.

It should be understood that in actual application, the mobile phone 100 may include more or fewer components than those shown in FIG. 1 and FIG. 2. This is not limited in the embodiments of this application.

A software system of the electronic device to which the embodiments of this application are applicable may use a hierarchical architecture, an event-driven architecture, a microkernel architecture, a micro service architecture, or a cloud architecture. In the embodiments of this application, the software structure of the electronic device is described by using an Android ( ) system with a hierarchical architecture as an example.

Figure 3:
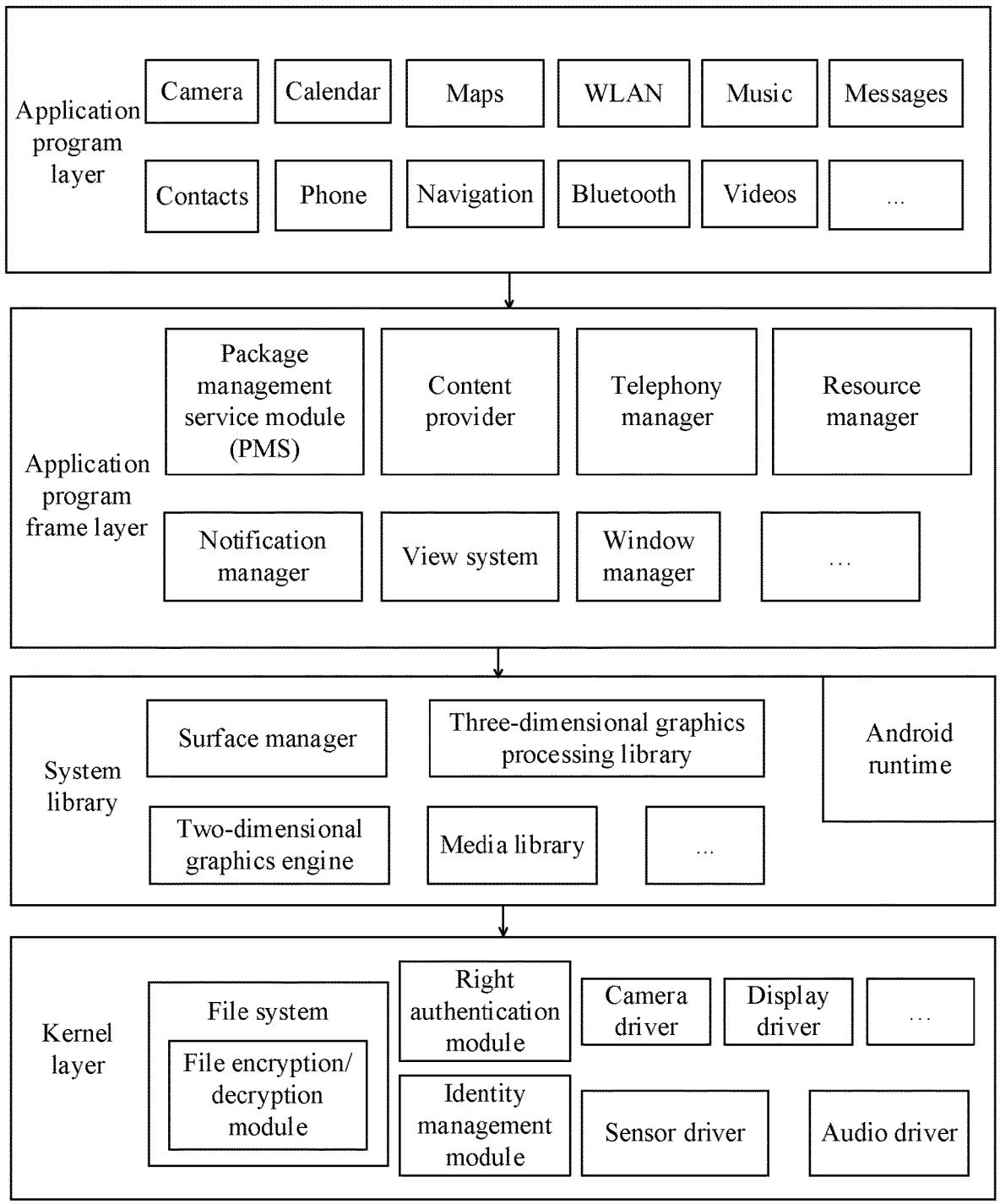
FIG. 3 is a schematic structural diagram of an Android operating system according to an embodiment of this application.

FIG. 3 is a block diagram of a software structure of a mobile phone 100 according to an embodiment of this application.

In the hierarchical architecture, software is divided into several layers, and each layer has a clear role and task. Layers communicate with each other through a software interface. In some embodiments, the Android system is divided into four layers that are respectively an application program layer, an application program framework layer, an Android runtime and a system library, and a kernel layer from top to bottom.

The application program layer may include a series of application program packages. As shown in FIG. 3, the application program packages may include application programs such as contacts, camera, gallery, calendar, phone, maps, navigation, BLUETOOTH™, music, videos, and messages.

The application program framework layer provides an application programming interface (API) and a programming framework for an application program at the application program layer. The application program framework layer includes some predefined functions.

As shown in FIG. 3, the application program framework layer may include a window manager, a content provider, a view system, a telephony manager, a resource manager, a notification manager, a package management service module, and the like.

The window manager is configured to manage a window program. The window manager may obtain a size of a display screen, determine whether there is a status bar, lock the screen, capture the screen, and the like.

The content provider is configured to store and obtain data, so that the data can be accessed by an application program. The data may include a video, an image, audio, calls that are made and answered, a browsing history and bookmarks, a phone book, and the like.

The view system includes a visual control such as a control for text display or a control for picture display. The view system may be configured to construct an application program. A display interface may include one or more views. For example, a display interface including an SMS message notification icon may include a view for text display and a view for picture display.

The telephony manager is configured to provide a communication function of the mobile phone 100, for example, manage a call status (including answering, disconnecting, and the like).

The resource manager provides various resources for an application program, for example, a localized character string, an icon, a picture, a layout file, and a video file.

The notification manager enables an application program to display notification information on the status bar, and may be configured to transfer a message of a notification type. The message may automatically disappear after a short stay without interaction with the user. For example, the notification manager is configured to notify download completion, provide a message prompt, and the like. The notification manager may further be a notification that appears on a top status bar of the system in a form of a graph or a scroll bar text, for example, a notification of an application program running in background, or may further be a notification that appears on the screen in a form of a dialog window. For example, text information is prompted on the status bar, a prompt tone is made, the electronic device vibrates, or an indicator light flashes.

The package management service module is configured to, when an application is started, obtain fixed identity information of the application, for example, a package name and a signature of the application.

The Android runtime includes a core library and a virtual machine. The Android runtime is responsible for scheduling and managing the Android system.

The core library includes two parts: One part is a functional function that needs to be invoked in a Java language, and the other part is an Android core library.

The application program layer and the application program framework layer are run in the virtual machine. The virtual machine executes Java files of the application program layer and the application program framework layer as binary files. The virtual machine is configured to execute functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem, and provides fusion of 2D and 3D layers for a plurality of application programs.

The media library supports playback and recording of a plurality of common audio and video formats, a still image file, and the like. The media library may support a plurality of audio/video encoding formats, for example, MPEG4, H.264, MP3, AAC, AMR, JPG, and PNG.

The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, a sensor driver, and the like. This is not limited in the embodiments of this application.

In the embodiments of this application, the kernel layer further includes a file system (for example, F2FS). The file system includes a file encryption/decryption module, and the module is configured to encrypt and decrypt a file.

In addition, in the embodiments of this application, the kernel layer further includes a right authentication module and an identity management module.

The identity management module is configured to obtain authorized fixed identity information of an application from the package management service module, and establish a mapping relationship between the authorized fixed identity information and a file identifier and a correspondence between a process identifier of an application to which the file belongs and the authorized fixed identity information. A reason that the identity management module needs to generate the foregoing correspondence is that due to a limitation of the hierarchical structure of the operating system, the file system is located at the kernel layer and cannot directly obtain the authorized fixed identity information of the application from the application layer. Therefore, the identity management module needs to store the correspondence. It should be noted that the authorized fixed identity information is fixed identity information of the application, and is obtained from the package management service module. In the embodiments of this application, the authorized fixed identity information is stored in the identity management module, and may be tampered with by a malicious application. However, the file system still considers the fixed identity information that is tampered with as the authorized fixed identity information, to perform access right authentication. The authorized fixed identity information in the embodiments of this application may be formed by combining all or some of a package name, a signature, and a UUID, or may be obtained by performing a hash operation on all or some of a package name, a signature, and a UUID. For example, in the embodiments of this application, authorized fixed identity information of a WeChat application may be a combination of a package name and a signature of the WeChat application, namely, com.android.weixin184afda9653afe. For another example, fixed identity information of a WeChat application may be a result obtained by performing a hash operation on a package name and a signature of the WeChat application, namely, HASH (com.android.weixin184afda9653 afe).

The right authentication module is configured to determine whether authorized fixed identity information corresponding to a process identifier in a file access request for accessing a current file is consistent with authorized fixed identity information corresponding to the file. If the authorized fixed identity information corresponding to the process identifier in the file access request for accessing the current file is consistent with the authorized fixed identity information corresponding to the file, authentication succeeds. Otherwise, authentication fails.

In the embodiments of this application, the kernel layer may further include a key encryption/decryption module. The key encryption/decryption module is configured to encrypt a file key by using the authorized fixed identity information, to generate file-key ciphertext. The file-key ciphertext is stored in a header of file ciphertext. After the authentication performed by the right authentication module succeeds, the key encryption/decryption module decrypts the file-key ciphertext by using first fixed identity information corresponding to the process identifier in the file access request for accessing the file. If the key encryption/decryption module cannot obtain the file key through decryption, the key encryption/decryption module notifies the right authentication module that the authentication fails. Otherwise, the authentication succeeds, and the file key is obtained through decryption. Subsequently, the file encryption/decryption module decrypts the file ciphertext by using the file key, to obtain file plaintext.

Stage 1

Figure 4A:
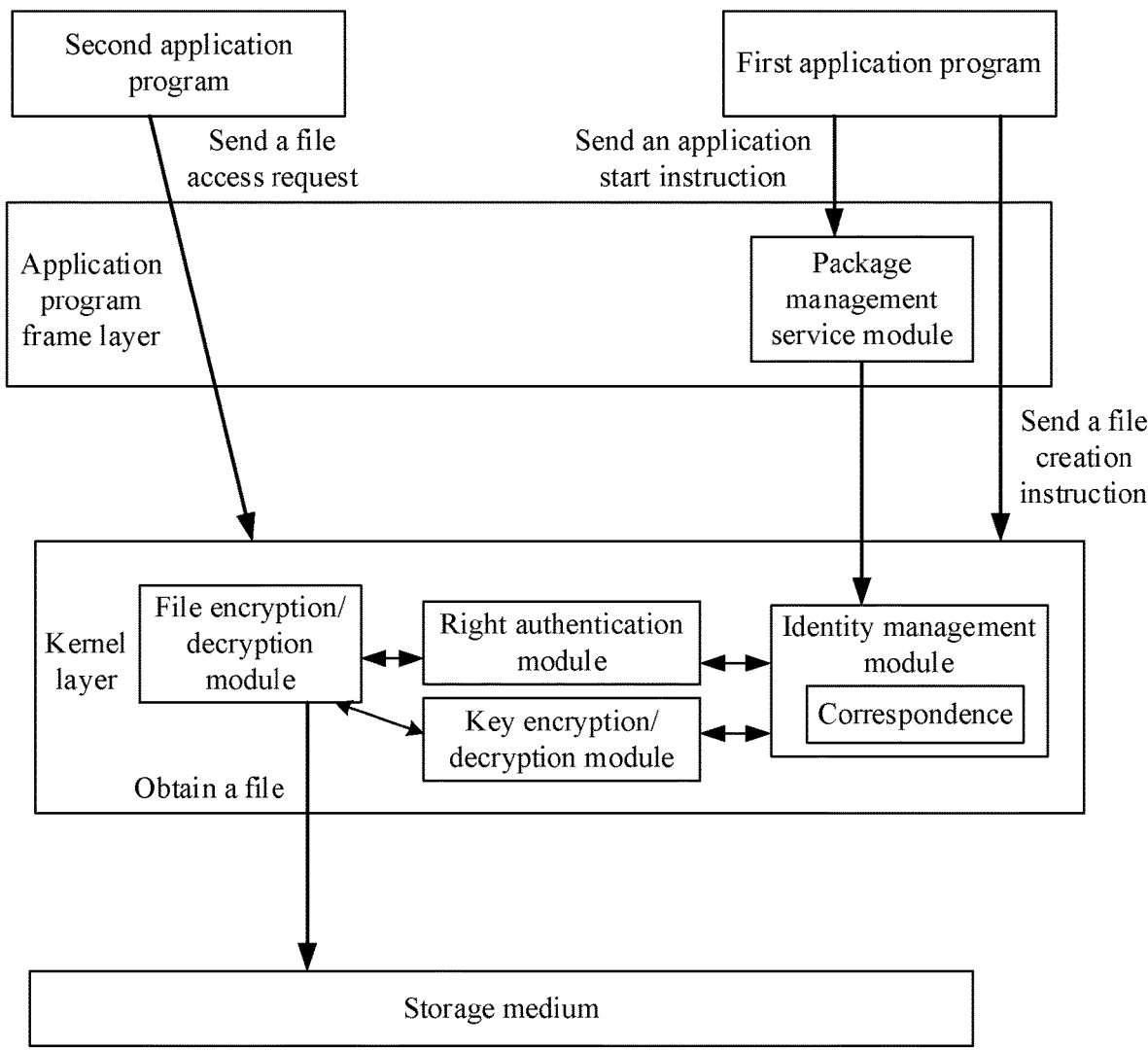
FIG. 4a to FIG. 4c are a group of schematic diagrams of interaction between modules for file access according to an embodiment of this application.
Figure 4B:
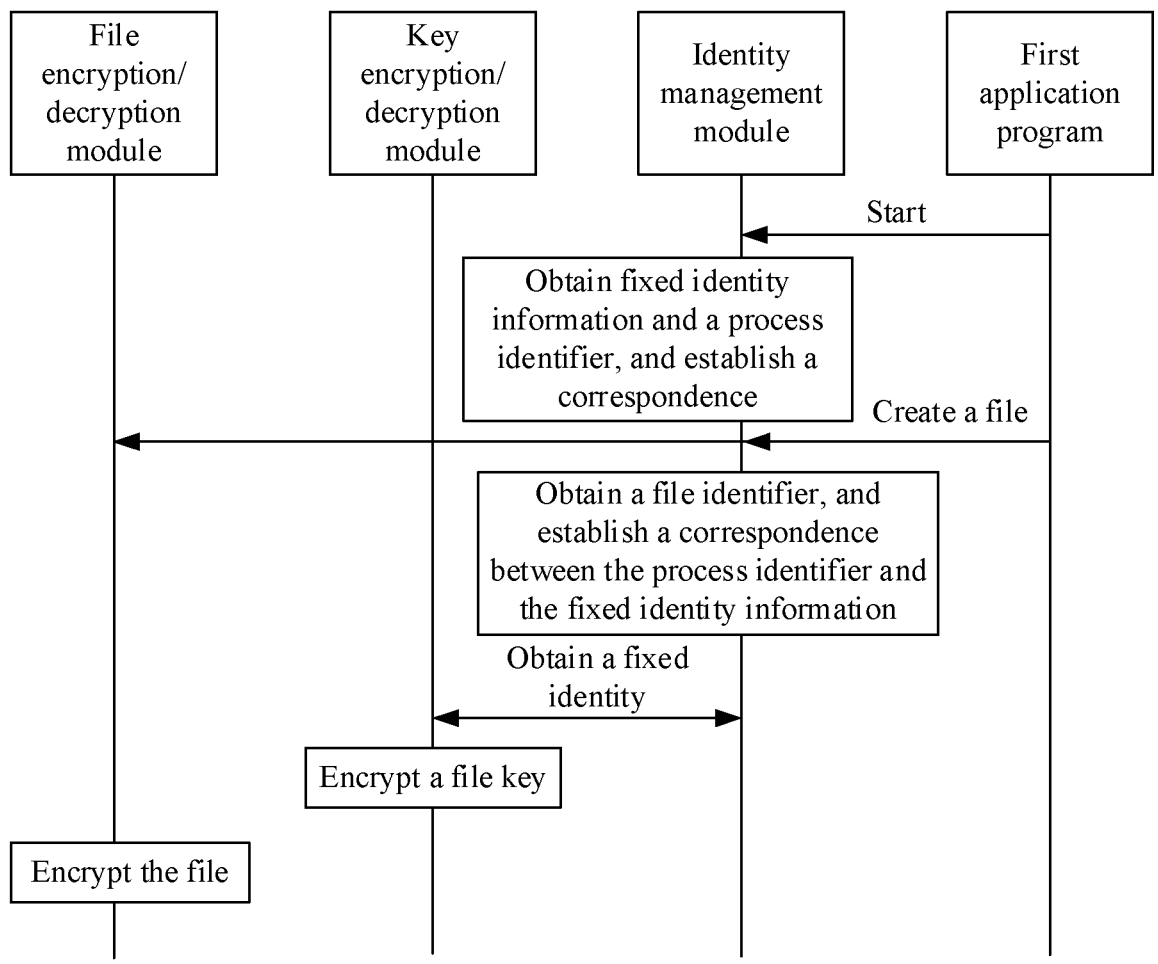

For example, as shown in FIG. 4a and FIG. 4b, when a first application program or a second application program is started, the identity management module obtains authorized fixed identity information of the application by using the package management service module, and establishes a first correspondence between the authorized fixed identity information of the application and a process identifier of the application. In addition, when the first application program sends a file creation instruction to the file system, the identity management module obtains an identifier of a created file, and establishes a second correspondence between the file and the authorized fixed identity information.

It should be noted that the second correspondence may be stored in the identity management module in a form of a mapping table, or the fixed identity information may be directly added into a header of the created file, to implement a correspondence between the fixed identity information and the file.

Next, the key encryption/decryption module obtains the authorized fixed identity information from the identity management module, and encrypts a file key of the created file by using the authorized fixed identity information, to obtain file-key ciphertext. The file system encryption/decryption module encrypts the created file by using the file key, to generate file ciphertext. A header of the file ciphertext carries the authorized fixed identity information and the file-key ciphertext. Subsequently, the file encryption/decryption module stores, into a storage medium, the file ciphertext obtained through encryption.

Stage 2

Figure 4C:
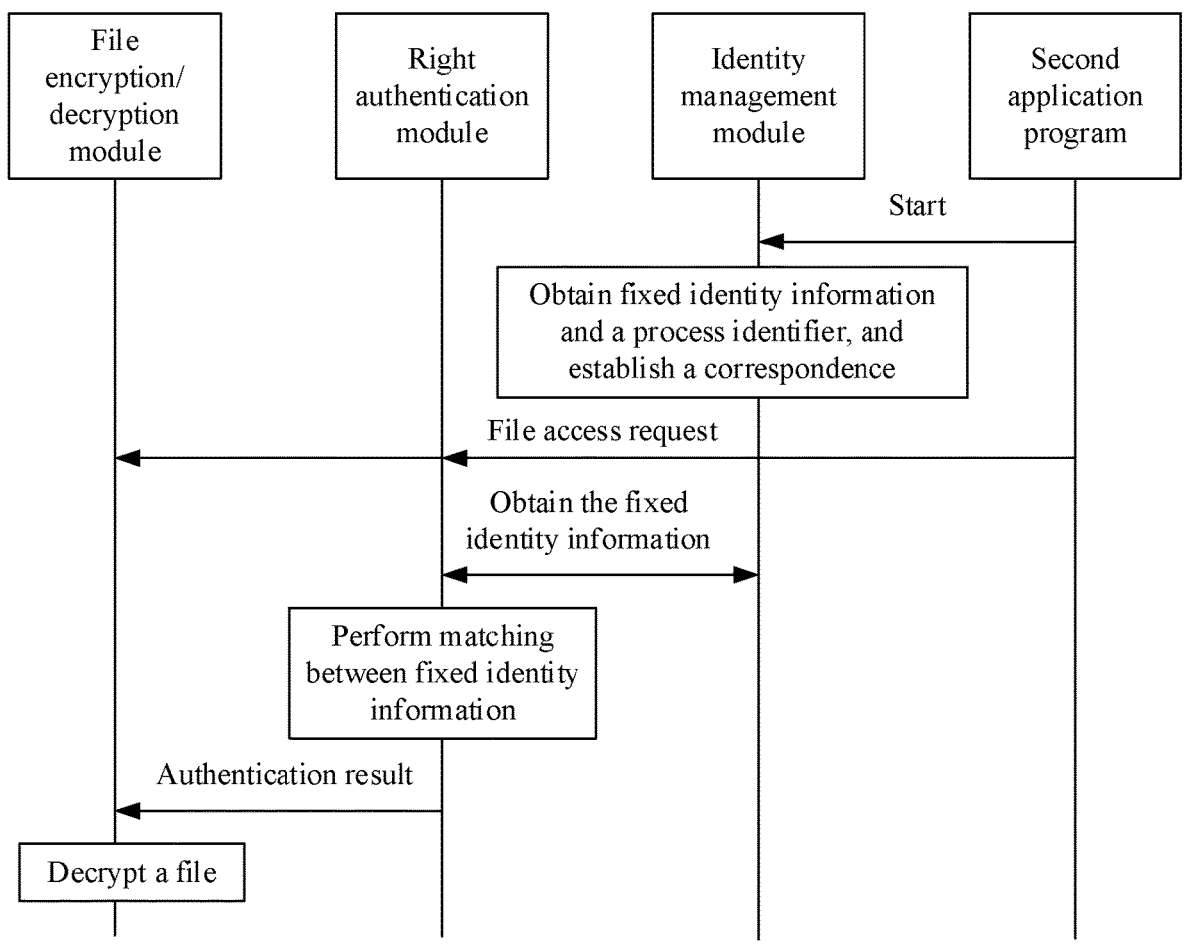

For example, as shown in FIG. 4c, when the second application program is started, the identity management module obtains fixed identity information of the second application program and a process identifier of the application from the package service management module, and establishes a correspondence between the fixed identity information and the process identifier of the second application program. When the second application program sends a file access request to the file system at the kernel layer, the right authentication module first searches the identity management module for fixed identity information corresponding to a process identifier in the file access request, and searches the identity management module for authorized fixed identity information corresponding to an identifier of a to-be-accessed file. If the two pieces of fixed identity information are consistent, authentication succeeds. Otherwise, authentication fails. Next, the right authentication module sends an authentication result to the file encryption/decryption module, and the file encryption/decryption module determines whether to decrypt the file. In a case, if the authentication succeeds, the file system encryption/decryption module obtains file ciphertext from a storage medium, and decrypts the file ciphertext by using a file key, to obtain file plaintext. In another case, if the authentication fails, the file system encryption/decryption module refuses to decrypt the file.

In a possible embodiment, the file encryption/decryption module may further include the authorized fixed identity information corresponding to the file in the file ciphertext obtained through encryption. When the file system receives the file access request, the right authentication module first searches the identity management module for the first correspondence to determine the first fixed identity information corresponding to the process identifier in the file access request, and then matches the first fixed identity information with the fixed identity information in the file ciphertext obtained from the storage medium. If the matching succeeds, authentication succeeds. Otherwise, authentication fails.

In a possible embodiment, the key encryption/decryption module may search the identity management module for the authorized fixed identity information corresponding to the to-be-accessed file, encrypt the file key of the file by using the authorized fixed identity information, to obtain the file-key ciphertext, and store the file-key ciphertext into the header of the file ciphertext. If the authentication performed by the right authentication module succeeds, the key encryption/decryption module first invokes the first fixed identity information corresponding to the process identifier in the file access request, to decrypt the file key. If the key encryption/decryption module cannot obtain the file key through decryption, the key encryption/decryption module notifies the right authentication module that the authentication fails. Otherwise, the file key is obtained through decryption. Next, the file encryption/decryption module decrypts the file ciphertext by using the file key.

It should be noted that the right authentication module and the identity management module may be independent of the file system, or may be integrated into the file system together with the file encryption/decryption module and the key encryption/decryption module. As shown in FIG. 4a, a function of the right authentication module and a function of the identity management module are respectively implemented in different modules, and communication between different modules belongs to inter-process communication. In addition, the function of the right authentication module and the function of the identity management module may be integrated into one module. When the functions are integrated into one module, invoking of fixed identity information belongs to intra-process communication.

Figure 5:
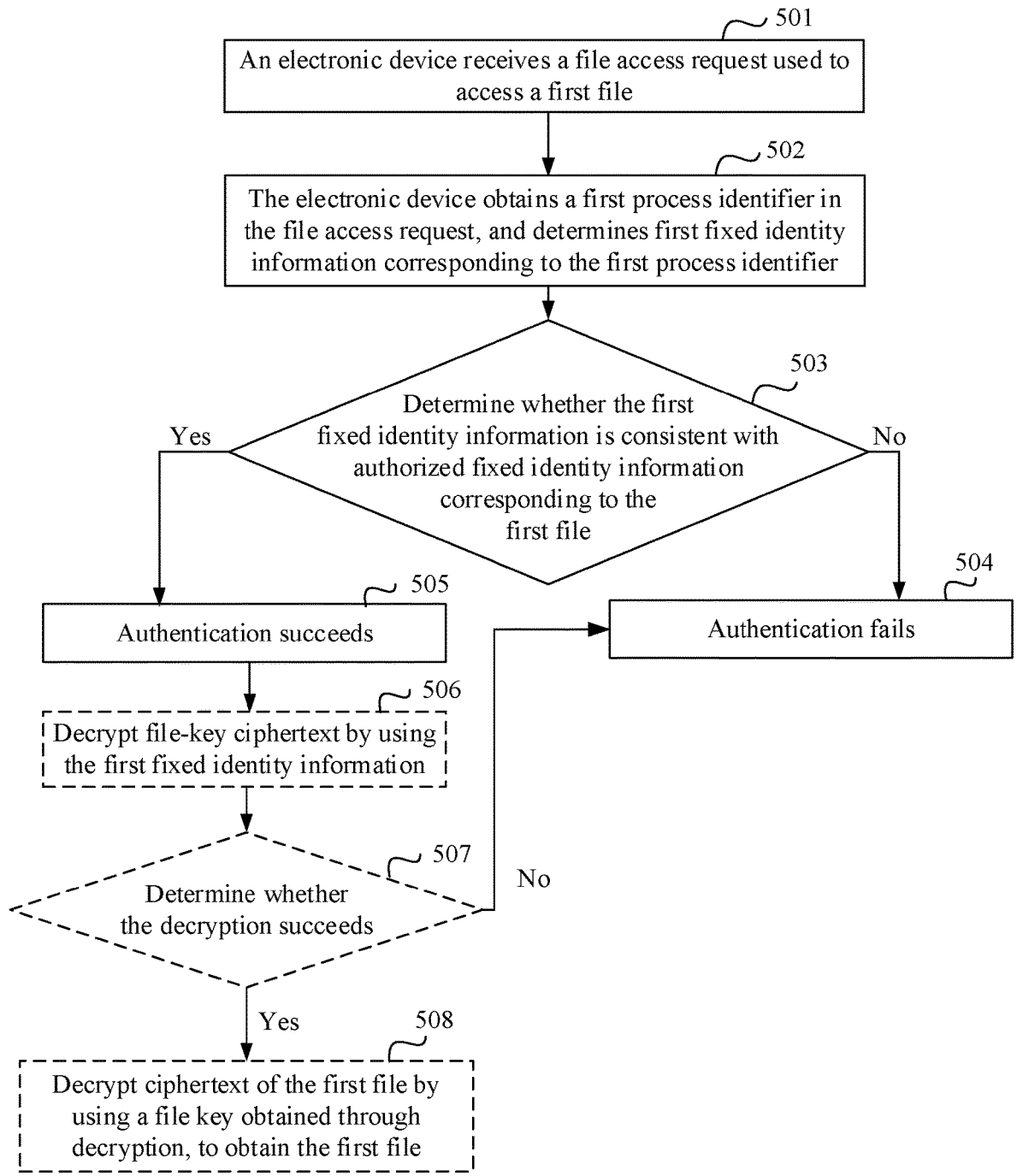
FIG. 5 is a schematic flowchart of a file access right authentication method according to an embodiment of this application.

Based on the software structure shown in FIG. 3, an embodiment of this application provides a file access right authentication method. Referring to a procedure shown in FIG. 5, the method is performed by an electronic device, and the method includes the following steps.

Step 501: The electronic device receives a file access request, where the file access request is used to request to access a first file on the electronic device.

With reference to FIG. 4a, a file system of the electronic device receives a file access request from a second application program module at an application layer. The second application program may be an application program to which a to-be-accessed file belongs, or may be a malicious application on another electronic device connected to the electronic device.

Step 502: The electronic device obtains a first process identifier in the file access request, and determines first fixed identity information corresponding to the first process identifier.

It should be noted that, when receiving a file access request, an operating system of the electronic device automatically allocates a unique first process identifier to the request. In addition, an identity management module obtains, from a package management service module, first fixed identity information of an application to which the process belongs, and generates a mapping relationship between the first process identity and the first fixed identity information. Therefore, a right authentication module at a kernel layer may find the first fixed identity information corresponding to the first process identity from the identity management module.

Step 503: The electronic device determines whether the first fixed identity information is consistent with authorized fixed identity information corresponding to the first file.

Specifically, in a first possible implementation, the right authentication module in the file system first obtains the authorized fixed identity information corresponding to the first file from the identity management module, and then compares the first fixed identity information with the authorized fixed identity information. In a second possible implementation, the file system obtains ciphertext of the first file from a storage medium, and a header of the ciphertext of the first file carries the authorized fixed identity information. Therefore, the right authentication module first obtains the authorized fixed identity information from the header of the ciphertext, and then compares the first fixed identity information with the authorized fixed identity information.

Step 504: When the first fixed identity information is inconsistent with the authorized fixed identity information, the electronic device determines that authentication of the file access request fails.

To be specific, if the matching between the first fixed identity information and the authorized fixed identity information does not succeed, it indicates that the file access request may come from a malicious application or an unauthorized program. Therefore, a file encryption/decryption module in the file system refuses to decrypt the file.

Step 505: When the first fixed identity information is consistent with the authorized fixed identity information, the electronic device determines that authentication of the file access request succeeds.

Subsequently, in a possible implementation, a file encryption/decryption module in the file system may obtain the ciphertext of the first file from the storage medium, decrypt the ciphertext by using a file key, to obtain the first file, and further feed back the first file to a side that sends the file access request. In a second possible implementation, a file encryption/decryption module in the file system decrypts the ciphertext by using a file key, to obtain the first file, and further feeds back the first file to a side that sends the file access request.

The malicious application may tamper with the authorized fixed identity information in the header of the file ciphertext to change the authorized fixed identity information into first fixed identity information corresponding to the malicious application, or the malicious application may tamper with the authorized fixed identity information that corresponds to the first file and that is in the identity management module, to change the authorized fixed identity information into first fixed identity information corresponding to the malicious application. Consequently, the foregoing authentication method fails. Therefore, in another possible embodiment, when the first fixed identity information is consistent with the authorized fixed identity information, the electronic device may further continue to perform step 506 and step 507, that is, the electronic device performs authentication for a second time. Specific steps are as follows:

Step 506: The electronic device decrypts file-key ciphertext of the first file by using the first fixed identity information.

To be specific, a key encryption/decryption module has encrypted the first file key in advance by using the authorized fixed identity information corresponding to the first file and a file system primary key, to generate the file-key ciphertext. The ciphertext of the first file carries the file-key ciphertext. After the matching between the first fixed identity information and the authorized fixed identity information succeeds, the key encryption/decryption module continues to decrypt the file-key ciphertext in the header of the first file by using the first fixed identity information and the file system key.

Step 507: The electronic device determines whether the decryption succeeds; and if the decryption does not succeed, the electronic device returns to step 504; or if the decryption succeeds, the electronic device performs step 508.

Step 508: When the decryption succeeds, the electronic device decrypts the ciphertext of the first file by using the file key obtained through decryption, to obtain the first file.

An example in which a mobile phone runs WeChat is used below to describe the foregoing file access right authentication procedure.

It should be noted that before the WeChat application receives a file access request, the following procedure needs to be performed first.

When the WeChat application is started, the identity management module obtains authorized fixed identity information (it is assumed that the authorized fixed identity information is com.android.weixin184afda9653afe) of the WeChat application by using the package management service module, and establishes a first correspondence between a process identifier and the authorized fixed identity information of the WeChat application. For example, the first correspondence is shown in Table 1.

TABLE 1

| Process identifier | Fixed identity information |
|---|---|
| 1111 | com.android.weixin184afda9653afe |

In addition, in an embodiment, when the WeChat application creates a first file (for example, saves a picture), the identity management module obtains an identifier of the file, and establishes a second correspondence between the identifier of the first file and the authorized fixed identity information of the WeChat application to which the file belongs. For example, the second correspondence is shown in Table 2.

TABLE 2

| File identifier | Fixed identity information |
|---|---|
| 333 | com.android.weixin184afda9653afe |

In another embodiment, when the WeChat application creates a first file (for example, saves a picture), the identity management module obtains the authorized fixed identity information of the WeChat application to which the file belongs, and inserts the authorized fixed identity information into a header of ciphertext of the first file. For example, a file structure is shown in Table 3.

TABLE 3

| File header | File body |
|---|---|
| Authorized fixed identity information | Ciphertext content of a first file |

In another embodiment, when the WeChat application creates a first file (for example, saves a picture), the identity management module obtains the authorized fixed identity information of the WeChat application to which the file belongs, and inserts the authorized fixed identity information into a header of ciphertext of the first file. In addition, the key encryption/decryption module encrypts a file key by using a file system primary key and the fixed identity information encryption file key, to obtain file-key ciphertext, and stores the file-key ciphertext into the header of the ciphertext of the file. For example, a file structure is shown in Table 4.

TABLE 4

| File header | File body |
|---|---|
| Authorized fixed identity information, and file-key ciphertext | Ciphertext content of a first file |

Further, after the WeChat application receives the file access request, the following authentication scenarios may exist.

Scenario 1

The file system obtains a first process identifier in the file access request, for example, 1111, and determines, through searching by using the identity management module, that first fixed identity information corresponding to the first process identifier is com.android.weixin184afda9653afe. Therefore, the right authentication module compares the first fixed identity information with the authorized fixed identity information that corresponds to the to-be-accessed first file in Table 2. Because the first fixed identity information is consistent with the authorized fixed identity information, authentication succeeds. Alternatively, the right authentication module compares the first fixed identity information with the authorized fixed identity information in the header of the ciphertext of the first file. Because the first fixed identity information is consistent with the authorized fixed identity information, authentication succeeds.

Scenario 2

The file system obtains a first process identifier in the file access request, for example, 2222, and determines, through searching by using the identity management module, that first fixed identity information corresponding to the first process identifier is null (NULL). Therefore, the right authentication module compares the first fixed identity information with the authorized fixed identity information that corresponds to the to-be-accessed first file and that is in Table 2. Because the first fixed identity information is inconsistent with the authorized fixed identity information, authentication fails. Alternatively, the right authentication module compares the first fixed identity information with the authorized fixed identity information in the header of the ciphertext of the first file. Because the first fixed identity information is inconsistent with the authorized fixed identity information, authentication fails.

Scenario 3

It is assumed that the file access request comes from a malicious application and the malicious application directly tampers with the authorized fixed identity information in the header of the ciphertext of the first file of WeChat to change the authorized fixed identity information into first fixed identity information of the malicious application (for example, change the authorized fixed identity information into null). In this case, the file system obtains a first process identifier in the file access request, for example, 2222, and determines, through searching by using the identity management module, that first fixed identity information corresponding to the first process identifier is null (NULL). Therefore, the right authentication module compares the first fixed identity information with authorized fixed identity information corresponding to the first file currently, to find that the first fixed identity information is consistent with the authorized fixed identity information. Further, the file encryption/decryption module decrypts the file-key ciphertext in the header of the ciphertext of the first file by using the first fixed identity information, and finds that the decryption fails. Therefore, the file encryption/decryption module notifies the right authentication module that authentication fails, and refuses to decrypt the ciphertext of the first file. Alternatively, when decrypting the file-key ciphertext, the file encryption/decryption module monitors whether used fixed identity information is consistent with the first fixed identity information. If the used fixed identity information is different from the first fixed identity information, the file encryption/decryption module notifies the right authentication module that authentication fails, and refuses to decrypt the ciphertext of the first file.

It may be learned that in the foregoing method, the file system may perform right authentication on a file access request. Only when the file access request comes from an application to which a file belongs, matching with authorized fixed identity information corresponding to the file can be completed. Even if a malicious application tampers with the authorized fixed identity information corresponding to the file, the tampering is detected in a procedure of decrypting file-key ciphertext, and consequently authentication fails. In the method, a current access mechanism of the file system can be effectively improved, and privacy security is effectively protected in combination with a sandbox mechanism. In addition, the file access right authentication procedure does not require participation of a user, and is invisible to the user. Therefore, system security is improved, user operations are also effectively simplified, and a user experience is improved.

Figure 6:
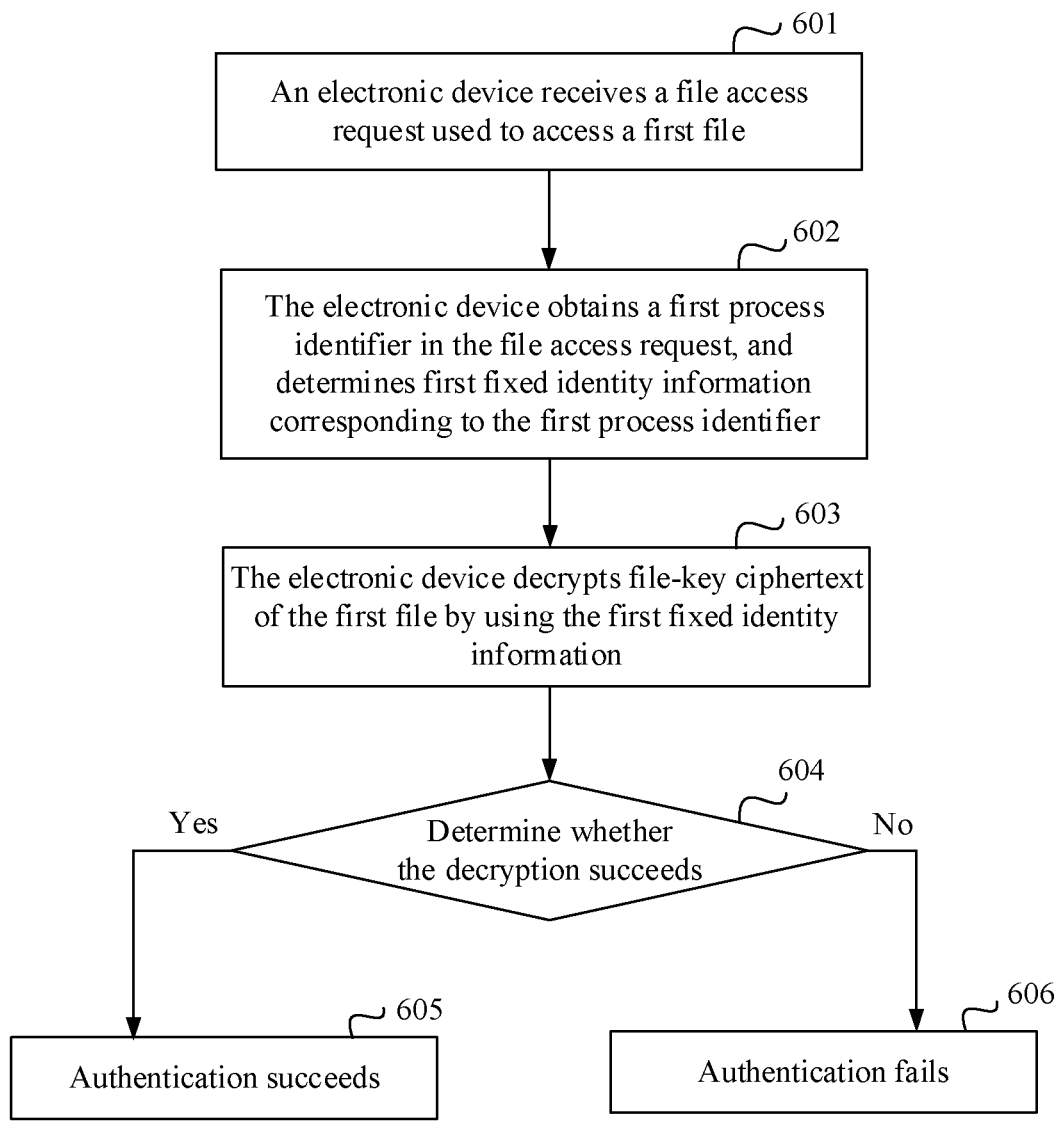
FIG. 6 is a schematic flowchart of another file access right authentication method according to an embodiment of this application.

An embodiment of this application provides another file access right authentication method. Referring to a procedure shown in FIG. 6, the method is performed by an electronic device, and the method includes the following steps.

Step 601: The electronic device receives a file access request, where the file access request is used to request to access a first file on the electronic device.

With reference to FIG. 4*a*, a file system of the electronic device receives a file access request from a second application program module at an application layer. The second application program may be an application program to which a to-be-accessed file belongs, or may be a malicious application on another electronic device connected to the electronic device.

Step 602: The electronic device obtains a first process identifier in the file access request, and determines first fixed identity information corresponding to the first process identifier.

It should be noted that, when receiving a file access request, an operating system of the electronic device automatically allocates a unique first process identifier to the request. In addition, an identity management module obtains, from a package management service module, first fixed identity information of an application to which the process belongs, and generates a mapping relationship between the first process identity and the first fixed identity information. Therefore, a right authentication module at a kernel layer may find the first fixed identity information corresponding to the first process identity from the identity management module.

Step 603: The electronic device decrypts file-key ciphertext by using the first fixed identity information.

The electronic device encrypts the first file in advance by using a file key, encrypts the file key by using authorized fixed identity information corresponding to the first file and a system primary key, to generate the file-key ciphertext, and stores the file-key ciphertext and the authorized fixed identity information into a header of ciphertext of the first file.

Specifically, a key encryption/decryption module in the file system decrypts the file-key ciphertext in the ciphertext of the first file by using the first fixed identity information. If the first fixed identity information is consistent with the fixed identity information corresponding to the first file, the decryption may succeed according to a preset decryption algorithm. Otherwise, the decryption fails.

Step 604: The electronic device determines whether the decryption succeeds; and if the decryption does not succeed, the electronic device performs step 605; otherwise, the electronic device performs step 606.

To be specific, the key encryption/decryption module in the file system determines whether the file-key ciphertext can be successfully decrypted by using the first fixed identity information and another key parameter (for example, the file system primary key and a random parameter).

Step 605: If the decryption does not succeed, determine that authentication of the file access request fails.

To be specific, if the decryption does not succeed, it indicates that the first fixed identity information is inconsistent with the authorized fixed identity information corresponding to the first file, and indicates that the file access request may come from a malicious application or an unauthorized program. Therefore, a file encryption/decryption module in the file system refuses to decrypt the file.

Step 606: If the decryption succeeds, determine that authentication of the file access request succeeds.

To be specific, if the decryption succeeds, it indicates that the first fixed identity information is consistent with the authorized fixed identity information corresponding to the first file, and indicates that the file access request may come from an application to which the first file belongs. Subsequently, a file encryption/decryption module in the file system decrypts the ciphertext by using the file key, to obtain the first file, and further feeds back the first file to a side that sends the file access request.

An example in which a mobile phone runs WeChat is still used below to describe the foregoing file access right authentication procedure.

It should be noted that before the WeChat application receives a file access request, the following procedure needs to be performed first.

When the WeChat application is started, the identity management module obtains authorized fixed identity information (it is assumed that the authorized fixed identity information is com.android.weixin184afda9653afe) of the WeChat application by using the package management service module, and establishes a first correspondence between a process identifier and the authorized fixed identity information of the WeChat application. For example, the first correspondence is shown in Table 1.

In addition, when the WeChat application creates a first file (for example, saves a picture), the key encryption/decryption module obtains the authorized fixed identity information of the WeChat application to which the file belongs and a file system primary key from the identity management module, and encrypts a file key of the first file by using the file system primary key and the fixed identity information, to obtain file-key ciphertext. Subsequently, the file encryption/decryption module encrypts the first file by using the file key, and stores the file-key ciphertext and the authorized fixed identity information into a header of ciphertext of the first file.

Further, after the WeChat application receives the file access request, the following authentication scenarios may exist.

Scenario 1

The file system obtains a first process identifier in the file access request, for example, 1111, and determines, through searching by using the identity management module, that authorized fixed identity information corresponding to the first process identifier is com.android.weixin184afda9653afe. Therefore, the key encryption/decryption module decrypts the file-key ciphertext in the header of the ciphertext of the first file by using the authorized fixed identity information and another key parameter (for example, the file system primary key or a random parameter) according to a preset key decryption algorithm. If the decryption succeeds, the key encryption/decryption module notifies the right authentication module that authentication succeeds.

Scenario 2

The file system obtains a first process identifier in the file access request, for example, 2222, and determines, through searching by using the identity management module, that first fixed identity information corresponding to the first process identifier is com.android.hook184afda9653afe (NULL). Therefore, the key encryption/decryption module decrypts the file-key ciphertext in the header of the ciphertext of the first file by using the first fixed identity information and another key parameter (for example, the file system primary key or a random parameter) according to a preset key decryption algorithm. Because the first fixed identity information is different from the fixed identity information that is used to encrypt the file key and that is in Table 1, the decryption fails, and the key encryption/decryption module notifies the right authentication module that authentication fails.

It may be learned that in the foregoing method, the file system may perform right authentication on a file access request. When first fixed identity information corresponding to a process identifier in the file access request cannot be used to complete decryption of file-key ciphertext, authentication fails. In the method, a current access mechanism of the file system can be improved, and file security can be effectively protected in combination with a sandbox mechanism. In addition, the file access right authentication procedure does not require participation of a user, and is invisible to the user. Therefore, system security is improved, user operations are also effectively simplified, and a user experience is improved.

In this embodiment of this application, in an aspect, the key encryption/decryption module may encrypt a file key by using a key parameter according to a preset key encryption algorithm, to obtain file-key ciphertext. For example, file-key ciphertext=ENC-READ (file system primary key, file key, and fixed identity information of an application). ENC-AEAD is a general term for authenticated encryption methods that include but are not limited to AES-GCM, AES-CCM, and combination use of AES encryption and HMAC authentication.

The AES-GCM algorithm is used as an example. A prototype parameter of the algorithm is: ciphertext=AES-GCM-ENC (key, plaintext, AAD, and IV). In this embodiment of this application, in the algorithm, the key may be the file system primary key, the plaintext is the file key, the AAD is the fixed identity information, and the IV is a specified random number (for example, a random number of 16 bytes). The ciphertext is file-key ciphertext. Certainly, in this embodiment of this application, another authenticated encryption algorithm may be used, such as AES-CCM or AES-CBC+HMAC. Principles thereof are similar, and examples are not listed one by one herein.

It may be learned that the file-key ciphertext generated based on the foregoing method is bound to fixed identity information. If fixed identity information used during decryption is not fixed identity information used during encryption, the file-key ciphertext cannot be decrypted.

Figure 7:
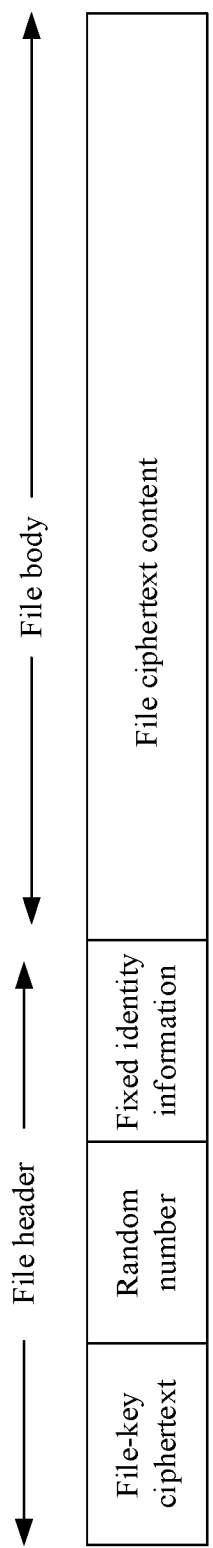
FIG. 7 is a schematic structural diagram of a file according to an embodiment of this application.

In addition, in this embodiment of this application, as shown in FIG. 7, the file system may write the file-key ciphertext and the key parameter (the random number parameter and the fixed identity information) into a header (metadata) of a file, and the metadata and file ciphertext content generated through encryption by using the file key constitute file ciphertext.

In another aspect, the key encryption/decryption module may decrypt file-key ciphertext by using a key parameter according to a preset key decryption algorithm, to obtain a file key (plaintext). To be specific, the key encryption/decryption module first obtains a file system primary key from a trusted execution environment, and then decrypts the file-key ciphertext with reference to the key parameter in a file header. For example, file key=DEC-AEAD (file system primary key, file-key ciphertext, and fixed identity information). ENC-AEAD is a general term for authenticated encryption methods that include but are not limited to AES-GCM, AES-CCM, and AES-HMAC.

The AES-GCM algorithm is used as an example. A prototype parameter of the algorithm is: plaintext=AES-GCM-DEC (key, ciphertext, AAD, and IV). In this embodiment of this application, in the algorithm, the key may be the file system primary key, the ciphertext is the file-key ciphertext obtained from the file header, the AAD is the fixed identity information (which may be obtained from the file header, or may be fixed identity information corresponding to a process identifier in a file access request), and the IV is a random number obtained from the file header.

Based on the foregoing method, because the encryption/decryption procedure of the file key is bound to fixed identity information, even if the fixed identity information in the file header is tampered with, authentication of the file access request fails because the file-key ciphertext cannot be decrypted.

Figure 8A:
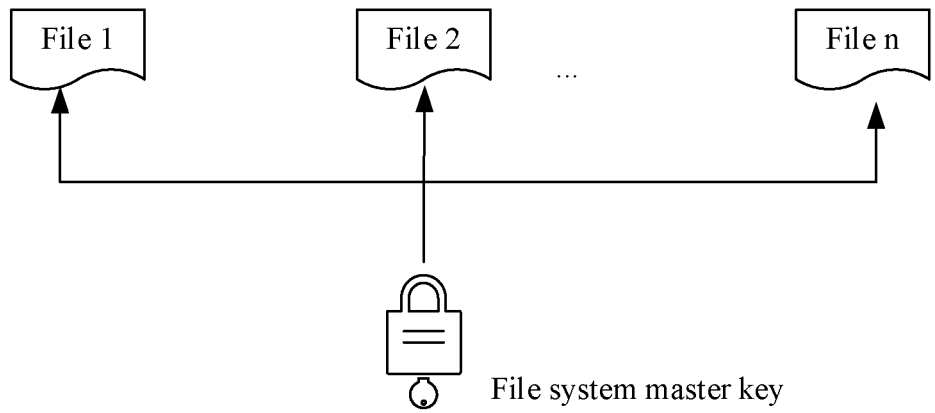
FIG. 8a to FIG. 8c are a group of schematic diagrams of a key protection level according to an embodiment of this application.

It should be noted that there may be one or more file keys used to encrypt a file. In this embodiment of this application, any one or more file keys used to encrypt the file may be encrypted. Specifically, there may be the following common key levels. Examples are as follows:

As shown in FIG. 8a, a file system primary key is used as a file key, and the file system primary key is used to encrypt each file in the file system. In this example, the key encryption/decryption module may encrypt the file system primary key by using fixed parameter information according to a preset key encryption algorithm, to obtain file-key ciphertext.

Figure 8B:
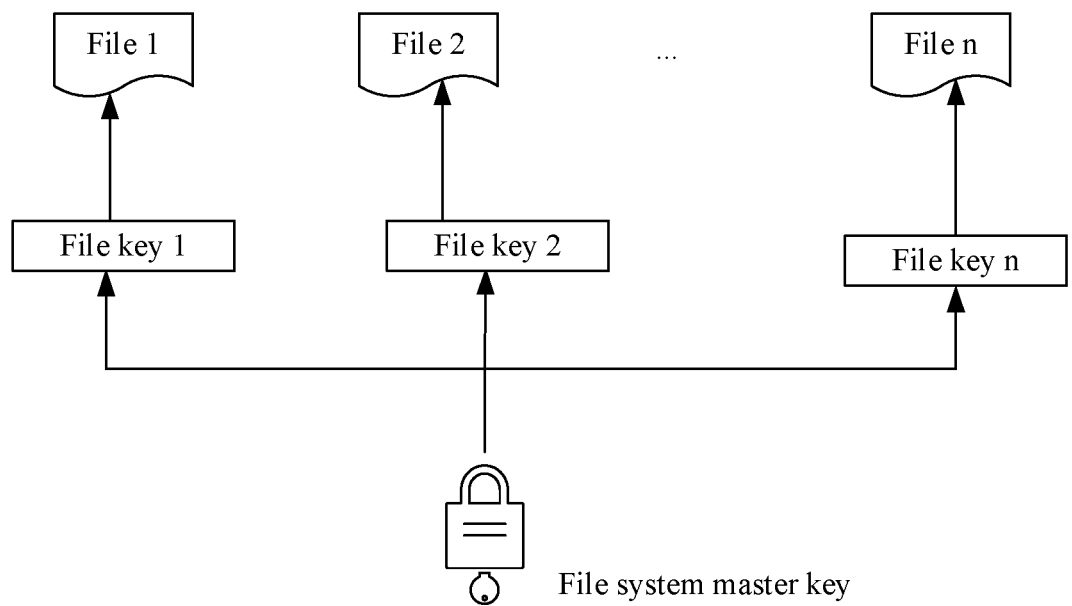

As shown in FIG. 8b, there is one file system primary key, each file has one corresponding file key, the file key is used to encrypt a corresponding file, and the file system primary key is used to encrypt the file key. In other words, a file key 1 is used to encrypt a file 1, a file key 2 is used to encrypt a file 2, a file key n is used to encrypt a file n, and the file system primary key is used to encrypt the file key 1, the file key 2, and the like. In this example, the key encryption/decryption module may encrypt the file key by using fixed parameter information and the file system primary key according to a preset key encryption algorithm, to obtain file-key ciphertext.

Figure 8C:
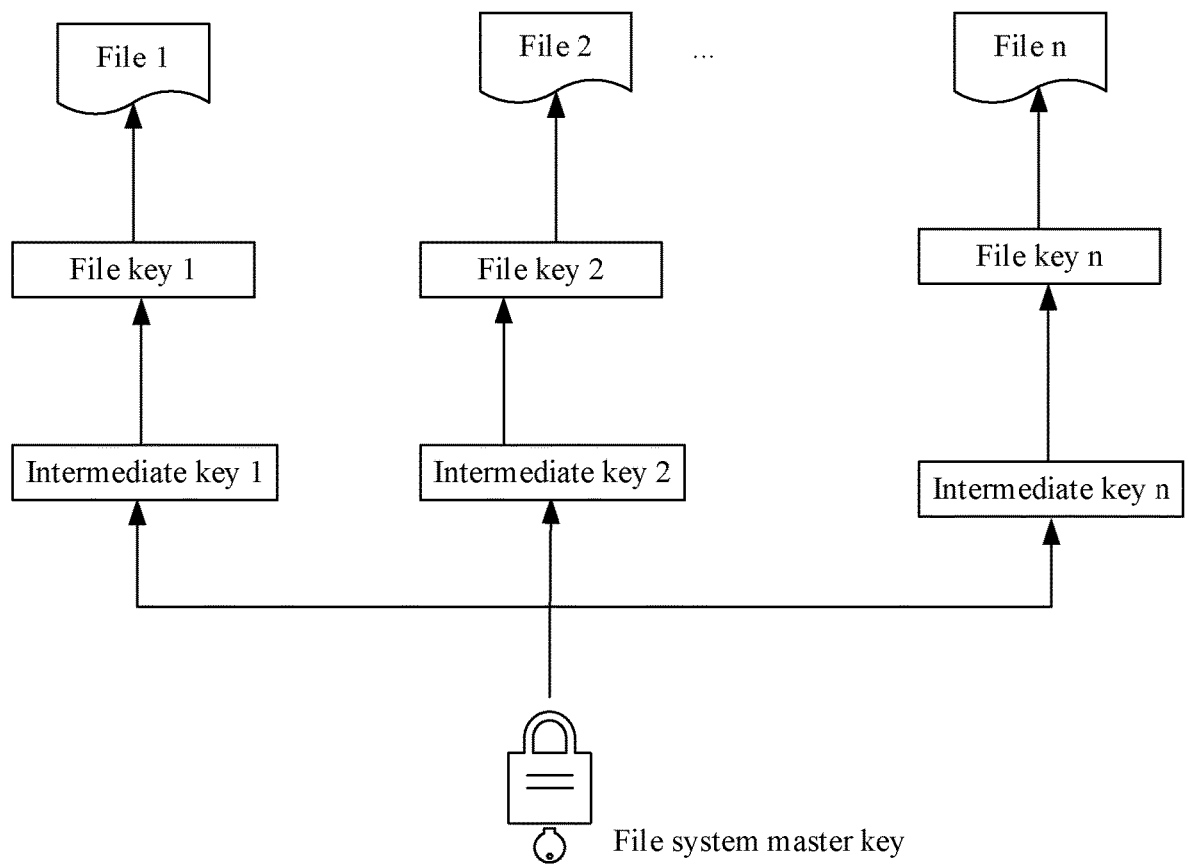

As shown in FIG. 8c, there is one file system primary key, each file has two corresponding file keys, the file key is used to encrypt a corresponding file, an intermediate key is used to encrypt the file key, and the file system primary key is used to encrypt the intermediate key. In other words, a file key 1 is used to encrypt a file 1, a file key 2 is used to encrypt a file 2, a file key n is used to encrypt a file n, an intermediate key 1 is used to encrypt the file key 1, an intermediate key 2 is used to encrypt the file key 2, an intermediate key n is used to encrypt the file key n, and the file system primary key is used to encrypt the intermediate key 1, the intermediate key 2, and the like. In this example, the key encryption/decryption module may encrypt the intermediate key or the file key by using fixed parameter information and the file system primary key according to a preset key encryption algorithm, to obtain file-key ciphertext. It should be noted that there may be a plurality of levels of intermediate keys. An intermediate key 11 is at a next level of the intermediate key 1, and the intermediate key 11 is used to encrypt the file key 1. In addition, a relationship between the intermediate key and the next level of key may be not limited to a one-to-one relationship. For example, there may be n intermediate keys and m next levels of intermediate keys (or m file keys), where n may be less than m, and one key in the n keys may be used to encrypt a plurality of keys in the m keys. Examples are not listed one by one herein.

An embodiment of this application further provides a file key generation method. In this method, a file system generates a file key by using fixed identity information and a file system primary key according to a preset derivation algorithm. For example, KDF (file system primary key, fixed identity of an application)=file key. KDF is a general term for derivation algorithms, such as HKDF and NIST800-108 HMACKDF. This is not limited herein. The file key generation method may also be used to generate an intermediate key at any level of the foregoing example key levels. In this method, the fixed identity information and the file system primary key that are used to generate the file key are not easily obtained, thereby improving security of the generated file key.

Figure 9:
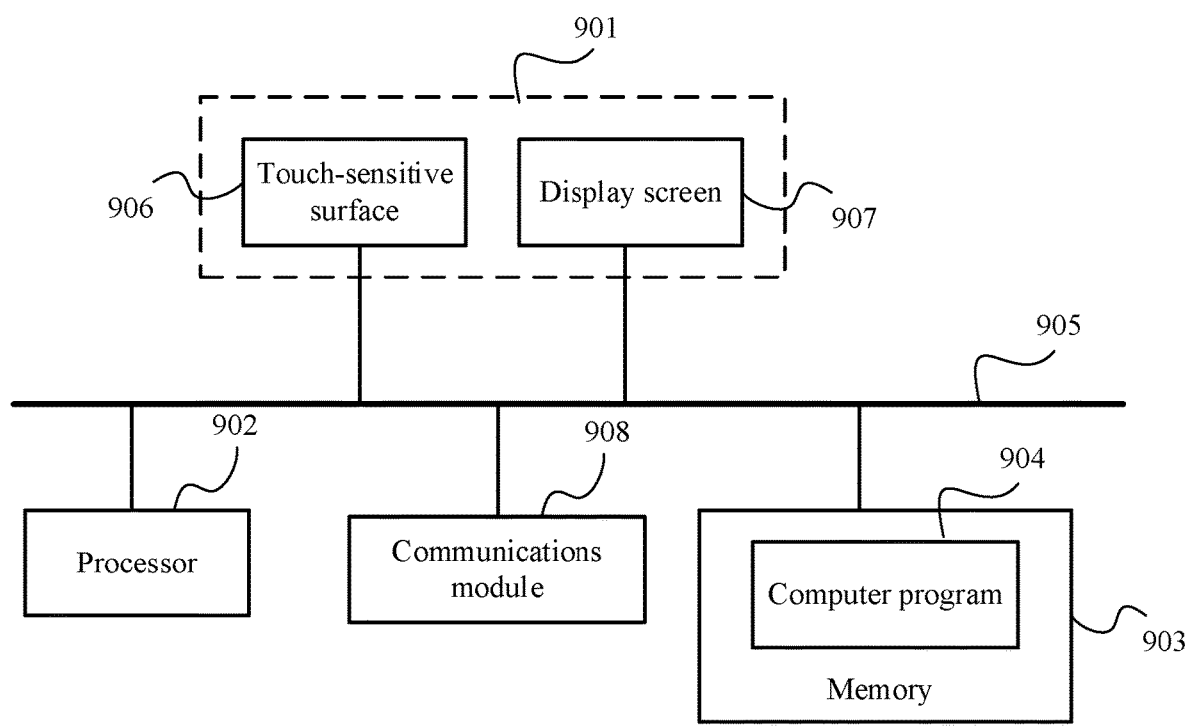
FIG. 9 is a schematic structural diagram of an electronic device according to an embodiment of this application.

As shown in FIG. 9, an embodiment of this application discloses an electronic device, including a touchscreen 901, where the touchscreen 901 includes a touch-sensitive surface 906 and a display screen 907, one or more processors 902, a memory 903, a communications module 908, one or more application programs (not shown), and one or more computer programs 904. The components may be connected by using one or more communications buses 905. The one or more computer programs 904 are stored in the memory 903, and are configured to be executed by the one or more processors 902. The one or more computer programs 904 include instructions. The instructions may be used to perform the steps in the foregoing embodiments. For example, the instructions may be used to perform the steps shown in FIG. 5 and FIG. 6.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to a current technology, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application embodiment, but are not intended to limit the protection scope of this application embodiment. Any variation or replacement within the technical scope disclosed in this application embodiment shall fall within the protection scope of this application embodiment. Therefore, the protection scope of the embodiments of this application shall be subject to the protection scope of the claims.

What is claimed is:

1. A file access right authentication method for an electronic device, the method comprising:
   receiving a file access request, wherein the file access request includes a first process identifier and a request to access a first file on the electronic device, wherein before receiving, by the electronic device, the file access request, the method further comprises:
      encrypting a file key of the first file based on a fixed identity information corresponding to the first file and a file system primary key according to a preset key encryption algorithm, to generate a file-key ciphertext, and
      encrypting the first file by using the file key of the first file, to generate ciphertext of the first file, wherein a header of the ciphertext of the first file comprises an authorized fixed identity information and the file-key ciphertext;
   obtaining the first process identifier and determining first fixed identity information corresponding to the first process identifier, wherein the first fixed identity information includes a parameter that identifies a fixed attribute of an application program corresponding to the first file; and
   determining that the first fixed identity information matches the authorized fixed identity information corresponding to the first file, and in response to the determining that the first fixed identity information matches the authorized fixed identity information corresponding to the first file, authenticating the file access request.

2. The method according to claim 1, wherein the authenticating of the file access request comprises: decrypting the file-key ciphertext by using the first fixed identity information, determining that the decrypting is successful, and in response to determining that the decrypting is successful, authenticating the file access request, wherein the file-key ciphertext is ciphertext of the file key used to encrypt the first file.

3. The method according to claim 1, wherein before receiving, by the electronic device, the file access request, the method further comprises:
obtaining a process identifier and fixed identity information of a running application program, establishing a correspondence between the process identifier and the fixed identity information, and establishing a correspondence between a newly created file and the fixed identity information.

4. The method according to claim 1, wherein
the determining that the first fixed identity information matches the authorized fixed identity information corresponding to the first file comprises:
matching the first fixed identity information with the authorized fixed identity information in the header of the ciphertext of the first file.

5. An electronic device, comprising a memory, a processor, and a computer program that is stored in the memory and that, when executed by the processor, causes the electronic device to:
receive a file access request, wherein the file access request includes a first process identifier and a request to access a first file on the electronic device, wherein before receiving, by the electronic device, the file access request, the electronic device is further caused to:
encrypt a file key of the first file based on a fixed identity information corresponding to the first file and a file system primary key according to a preset key encryption algorithm, to generate a file-key ciphertext, and
encrypt the first file by using the file key of the first file, to generate ciphertext of the first file, wherein a header of the ciphertext of the first file comprises an authorized fixed identity information and the file-key ciphertext;
obtain the first process identifier, and determine first fixed identity information corresponding to the first process identifier, wherein the first fixed identity information includes a parameter that identifies a fixed attribute of an application program corresponding to the first file; and
determine that the first fixed identity information matches authorized fixed identity information corresponding to the first file, and, in response to determining that the first fixed identity information matches the authorized fixed identity information, authenticating the file access request.

6. The electronic device of claim 5, wherein the authenticating of the file access request comprises: decrypting the file-key ciphertext by using the first fixed identity information, determining that the decrypting is successful, and when the decrypting is successful, authenticating the file access request, wherein the file-key ciphertext is ciphertext of the file key used to encrypt the first file.

7. The electronic device according to claim 5, wherein before receiving, by the electronic device, the file access request, the electronic device is further caused to:
obtain a process identifier and fixed identity information of a running application program, establishing a correspondence between the process identifier and the fixed identity information, and establishing a correspondence between a newly created file and the fixed identity information.

8. The electronic device according to claim 5, wherein
the determining that the first fixed identity information matches the authorized fixed identity information corresponding to the first file comprises:
matching the first fixed identity information with the authorized fixed identity information in the header of the ciphertext of the first file.

9. A non-transitory computer readable medium, wherein the computer readable storage medium comprises a computer program that, when executed by a processor of an electronic device, cause the electronic device to:
receive a file access request, wherein the file access request includes a first process identifier and a request to access a first file on the electronic device, wherein before receiving, by the electronic device, the file access request, the electronic device is further caused to:
encrypt a file key of the first file based on a fixed identity information corresponding to the first file and a file system primary key according to a preset key encryption algorithm, to generate a file-key ciphertext, and
encrypt the first file by using the file key of the first file, to generate ciphertext of the first file, wherein a header of the ciphertext of the first file comprises an authorized fixed identity information and the file-key ciphertext;
obtain the first process identifier, and determine first fixed identity information corresponding to the first process identifier, wherein the first fixed identity information includes a parameter that identifies a fixed attribute of an application program corresponding to the first file; and
determine that the first fixed identity information matches the authorized fixed identity information corresponding to the first file, and, in response to determining that the first fixed identity information matches the authorized fixed identity information corresponding to the first file, authenticating the file access request.

10. The non-transitory computer readable medium according to claim 9, wherein the determine that authentication of the file access request succeeds comprises:
decrypting the file-key ciphertext by using the first fixed identity information, determining that the decrypting is successful, in response to determining that the decrypting is successful authenticating the file access request, wherein the file-key ciphertext is ciphertext of the file key used to encrypt the first file.

11. The non-transitory computer readable medium according to claim 9, wherein before receiving, by the electronic device, the file access request, the electronic device is further caused to:
obtain a process identifier and fixed identity information of a running application program, establishing a correspondence between the process identifier and the fixed identity information, and establishing a correspondence between a newly created file and the fixed identity information.

12. The non-transitory computer readable medium according to claim 9, wherein the determining that the first fixed identity information matches the authorized fixed identity information corresponding to the first file comprises:
matching the first fixed identity information with the authorized fixed identity information in the header of the ciphertext of the first file.

* * * * *